(12) United States Patent
Schuster (10) Patent No.: US 12,150,519 B2
(45) Date of Patent: Nov. 26, 2024

(54) INSOLE

(71) Applicant: adidas AG, Herzogenaurach (DE)

(72) Inventor: Bernhard Leopold Schuster, Nuremberg (DE)

(73) Assignee: adidas AG, Herzogenaurach (DE)

( * ) Notice: Subject to any disclaimer, the term of this patent is extended or adjusted under 35 U.S.C. 154(b) by 35 days.

(21) Appl. No.: 16/945,374

(22) Filed: Jul. 31, 2020

(65) Prior Publication Data

US 2021/0030113 A1 Feb. 4, 2021

(30) Foreign Application Priority Data

Aug. 2, 2019 (DE) .......................... 102019211661.2

(51) Int. Cl.
| | |
|---|---|
| *A43B 17/14* | (2006.01) |
| *A43B 7/26* | (2006.01) |
| *A43B 17/00* | (2006.01) |
| *A43B 17/18* | (2006.01) |
| *A43D 11/03* | (2006.01) |
| *B33Y 80/00* | (2015.01) |

(52) U.S. Cl.
CPC ................ *A43B 17/14* (2013.01); *A43B 7/26* (2013.01); *A43B 17/006* (2013.01); *A43B 17/18* (2013.01); *A43D 11/03* (2013.01); *B33Y 80/00* (2014.12)

(58) Field of Classification Search
CPC ....... A43B 17/006; A43B 17/02; A43B 17/08; A43B 17/16; A43B 7/1405; A43B 7/141; A43B 7/1415; A43B 7/145; A43B 7/1425; A43B 7/26

USPC ........................................................ 36/43, 44
See application file for complete search history.

(56) References Cited

U.S. PATENT DOCUMENTS

| | | | |
|---|---|---|---|
| 10,595,589 B2 | 3/2020 | Hedström | |
| 2005/0241186 A1* | 11/2005 | Mulligan | ............... A43B 17/00 36/43 |
| 2014/0020191 A1* | 1/2014 | Jones | ..................... B33Y 10/00 427/256 |
| 2014/0090273 A1 | 4/2014 | Piontkowski | |
| 2014/0223776 A1* | 8/2014 | Wardlaw | ............... A43B 13/187 36/102 |
| 2016/0227880 A1* | 8/2016 | Champagne | ......... A43B 5/1641 |
| 2018/0014603 A1* | 1/2018 | Saint Dunbar | ........ A43B 7/141 |
| 2018/0140053 A1* | 5/2018 | Van Heijkamp | ....... A43B 17/14 |
| 2018/0184759 A1* | 7/2018 | Cherneski | .............. A43B 17/18 |

(Continued)

FOREIGN PATENT DOCUMENTS

| | | |
|---|---|---|
| CN | 201216209 Y | 4/2009 |
| CN | 202311522 U | 7/2012 |
| CN | 202364944 U | 8/2012 |

(Continued)

OTHER PUBLICATIONS

Chinese Notification of the First Office Action issued in Chinese Application No. 202010661209.8, mailed Aug. 3, 2021, 18 pages.

*Primary Examiner* — Aiying Zhao
(74) *Attorney, Agent, or Firm* — Sterne, Kessler, Goldstein & Fox P.L.L.C.

(57) ABSTRACT

The invention concerns an insole comprising a substrate and a printed layer, wherein the substrate comprises a first friction coefficient on a reference surface and the printed layer comprises a second friction coefficient on the reference surface, which is higher than the first friction coefficient.

17 Claims, 4 Drawing Sheets

(56) References Cited

U.S. PATENT DOCUMENTS

2018/0200100 A1* 7/2018 Arciuolo ................ A43B 7/143
2021/0186154 A1* 6/2021 Yuasa .................... B32B 25/14

FOREIGN PATENT DOCUMENTS

| | | | |
|---|---|---|---|
| CN | 202618494 U | 12/2012 | |
| CN | 203207297 U | 9/2013 | |
| CN | 108541216 A | 9/2018 | |
| DE | 19921829 A1 | 11/2000 | |
| DE | 102015121670 A1 | 6/2016 | |
| EP | 0995364 A1 | 4/2000 | |
| WO | WO-2006019042 A1 * | 2/2006 | ............. A43B 13/22 |
| WO | WO-2017182930 A2 * | 10/2017 | ............ A43B 13/127 |
| WO | WO-2017208257 A1 * | 12/2017 | ............. A43B 17/14 |

* cited by examiner

INSOLE

BACKGROUND OF THE INVENTION

Technical Field

The present invention relates to an improved insole and methods for production of the same.

Technical Background

Insoles are frequently used in footwear in order to increase the wearing comfort. An insole may for example have certain cushioning properties that dampen the impact experienced by a foot during walking, hiking, running or other athletic activity.

Existing footwear development have focused primarily on two elements: the upper on the one hand and the midsole on the other hand. The importance of an insole for the performance of an athlete has so far been underappreciated.

JP 3187084 U concerns a sports shoe, and more particularly, a flexible toe portion capable of enhancing the degree of freedom and stability of the toes of a foot during sporting or walking, etc., as well as improving grip and kicking properties.

JP 4172798 A relates to a shoe insole capable of improving exercise performance by focusing attention on how resistance works between the foot and the ground during exercise and forming transverse and lengthwise uneven grooves separated and differentiated in direction from each other in areas corresponding to the tiptoe section and the big and small toe base section for increasing grip in longitudinal and lateral directions, respectively.

WO 2006019042 A1 relates to an insole of a shoe capable of increasing exercise performance, wherein, to increase grip forces in the longitudinal and lateral directions by improving the application of resistances from a ground and a foot thereto during exercise, grooves or projections are formed in each of the area thereof corresponding to a toe part and the area thereof corresponding to a thenar eminence part and a little finger eminence part.

It is an object underlying the present invention to further improve the performance of an insole in particular for athletic applications.

SUMMARY OF THE INVENTION

According to an embodiment of the invention, an insole comprises a substrate and a printed layer, wherein the substrate comprises a first friction coefficient on a reference surface and the printed layer comprises a second friction coefficient on the reference surface, which is higher than the first friction coefficient.

The reference surface may be a clean and flat surface consisting of thermoplastic polyurethane, low-density polyethylene, medium-density polyethylene, or high-density polyethylene.

An insole may be a sockliner, shoe liner, footbed etc. The insole may be removable to allow an old and worn insole to be replaced with a new one.

An insole according to this embodiment offers a larger amount of friction in the region to which the printed layer is applied.

When a human runner wears a shoe, the amount of grip may be determined by the amount of friction between the ground and an outsole, the stiffness of the outsole-midsole construction and the friction between midsole and insole and insole and foot/sock. A weak spot may be the amount of friction between the insole and the foot or sock of the wearer.

A common problem with known insoles is that an athlete's foot may slide over the insole during athletic activity, such as running. Any sliding of the foot with respect to the insole causes a loss of energy and therefore reduces the performance the athlete may be able to achieve. An insole prevents this problem and therefore allows an improved performance by an athlete.

The printed layer may be applied at least to a metatarsal region of the substrate. When an athlete is running, it is usually a metatarsal region of the foot that actually first strikes the ground. Human runners therefore have the natural tendency to automatically squeeze and clench their toes in order to try to improve the grip with the ground. Therefore, it is important to improve the friction in a metatarsal region of the foot.

The printed layer may comprise a rubber and/or a polyurethane, e.g. a thermoplastic polyurethane. These materials are suitable for increasing the amount of friction and offer good abrasion resistance and longevity.

The printed layer may comprise an indentation on a surface of the printed layer that at least partially surrounds at least one toe. This may be perceived to be ergonomic by athletes due to the natural tendency of human runners to automatically squeeze and clench their toes in order to improve the grip with the ground. The feeling of extra support of the toes can also give the athlete a psychological advantage.

The printed layer may comprise five indentations on the surface of the printed layer, wherein each indentation at least partially surrounds a toe. Thus, a good level of support of the toes during a clenching motion may be achieved.

The first and second friction coefficient may be a static friction coefficient. A static friction coefficient may be more important than a dynamic friction coefficient since the amount of motion between the foot or the sock of the wearer and the insole should be minimal.

The printed layer may comprise at least one substantially longitudinal line and/or at least one substantially transverse line.

A longitudinal or transverse line may comprise a length and a width, and the length may be significantly greater than the width, e.g. at least three times as great.

A portion of the longitudinal line may be essentially parallel to a direction extending from a toe region to a heel region. Essentially parallel means with an angular deviation of no more than approximately 30 degrees, preferably 20 degrees. A longitudinal line need not be a straight line in a mathematical sense but may be somewhat bent.

A portion of the transverse line may be at a right angle to a direction extending from a toe region to a heel region. Essentially at a right angle means at an angle of between 60 and 120 degrees, preferably between 70 and 110 degrees. A transverse line need not be a straight line in a mathematical sense but may be somewhat bent.

A substantially longitudinal line would increase the amount of friction for movement at right angles to the longitudinal line, for example for the foot or sock to move from a medial region to a lateral region within the shoe. A substantially transverse line would increase the amount of friction for movement at right angles to the transverse line, for example for the foot or sock to move along a longitudinal direction inside of the shoe. Thus, unwanted movement of the foot or sock with respect to the insole may be limited especially along either one or both of these important directions within the shoe.

The printed layer may comprise a first portion comprising a first thickness of at least 0.2 mm, preferably at least 0.3 mm. Preferably, the first thickness is smaller than 2 mm. The greater the first thickness, the larger the amount of friction and the amount of support provided to the foot, but if the first thickness is too large, the insole will be uncomfortable to use and may lead to sports injuries such as blisters or abrasions. In particular, it may be noted that a certain amount of movement of the foot within the shoe may be required and thus too great an amount of friction may also be detrimental.

The printed layer may further comprise a second portion comprising a second thickness that is smaller than the first thickness. This may allow the insole to be adapted more accurately to the anatomy of a wearer's foot.

The printed layer may additionally or alternatively vary gradually in a gradient raised portion. Thus, sharp boundaries are avoided and the wearing comfort is improved.

It is to be understood that the first thickness and the second thickness are a height that is to be measured relative to the substrate.

The second portion may comprise, at least partly, the longitudinal line and/or the transverse line. This improves the wearing comfort perceived by the athlete.

The first thickness and/or the second thickness may increase from a toe region to a metatarsal region of the substrate. Therefore, the insole is adapted to the anatomy of human foot.

The substrate may comprise at least one recess. This further allows the wearing properties to be optimized. In particular, a recess may be formed more stable when formed in the substrate than in the printed layer.

The printed layer may be printed such as to form at least one groove in the printed layer. The variety of shapes of grooves that may be formed in the printed layer may be greater than that available in the substrate.

The recess in the substrate and/or the groove in the printed layer may comprise a depth of at least 0.2 mm, preferably at least 0.3 mm. Preferably, the depth is no greater than 2 mm. This allows a good fit to the human anatomy and a good balance between increasing friction and support on the one hand and maintaining comfort on the other hand.

The substrate may comprise ethyl vinyl acetate (EVA). EVA provides preferred cushioning properties and is easy to manufacture.

The substrate may further comprise a plurality of perforations. Perforations may be used to improve the breathability of the insole. Perforations may additionally be used to control the bending stiffness of the insole. For example, perforations may be located in the midfoot region in order to decrease the bending stiffness of the insole in the midfoot region.

Another aspect concerns a shoe comprising an insole according to an embodiment. The shoe therefore advantageously reduces the amount of movement of the foot within the shoe experienced by the wearer thus improving the performance for athletic use.

A further aspect concerns a method of producing an insole comprising: (a) providing a substrate, wherein the substrate comprises a first friction coefficient on a reference surface; (b) printing a printed layer, wherein the printed layer comprises a second friction coefficient on the reference surface, which is higher than the first friction coefficient.

Thus, the method allows an insole with the advantageous properties described herein to be manufactured. Generally, many of the advantages of the method and its embodiments to be described below directly correspond to advantages of the insole as described herein.

Printing may comprise screen printing. Screen printing allows several layers to be printed to create a desired thickness. Screen printing also allows a large variety of materials to be used and is therefore a preferred method.

Printing may alternatively or additionally comprise additive manufacturing methods. Additive manufacturing is taken to have its conventional meaning. That is, additive manufacturing is any technique which applies an additive shaping principle and thereby builds physical 3D geometries by successive addition of material. Additive manufacturing comprises 3D printing and techniques sometimes known as rapid prototyping. In particular, additive manufacturing comprises techniques such as laser sintering, direct metal laser sintering, selective laser melting, fused deposition modelling (FDM®), fused filament fabrication, and stereolithography. Any additive manufacturing method is suitable.

Additive manufacturing allows a level of customisation that would be neither technically nor economically feasible with existing manufacturing methods.

An advantageous printing method comprises stereolithography which allows the printed layer to be printed with particularly high-resolution and level of customizability at fast production speeds. The printing of the printed layer may comprise projecting ultraviolet light through an oxygen-permeable window into a reservoir of photopolymer. A sequence of UV images are projected onto a photopolymer thus selectively solidifying the photopolymer. The partially-constructed printed layer is lifted by a build platform out of the photopolymer reservoir. Oxygen may be supplied through the oxygen-permeable window, in order to prevent the partially-constructed second component from sticking to the window.

The printed layer may be printed/grown on the insole directly or attached in a separate step. In the latter case, attaching may comprise the application of an adhesive, glue, film, heat bonding, welding or any other suitable method of attachment.

The printing of the printed layer may comprise printing the printed layer at least onto a metatarsal region of the substrate thus allowing for several advantages as described herein.

The printed layer may comprise a rubber and/or a polyurethane, e.g. a thermoplastic polyurethane as described herein.

The printing of the printed layer may comprise forming an indentation on a surface of the printed layer that at least partially surrounds at least one toe. This advantageously improves the insole as described herein.

The printing of the printed layer may comprise forming five indentations on the surface of the printed layer, wherein each indentation at least partially surrounds a toe.

The first and second friction coefficient may be a static friction coefficient.

The printing of the printed layer may further comprise printing at least one substantially longitudinal line and/or one substantially transverse line.

The printing of the printed layer may further comprise printing a first portion of the printed layer comprising a first thickness of at least 0.2 mm preferably at least 0.3 mm. Preferably the first thickness is smaller than 2 mm.

The printing of the printed layer may further comprise printing a second portion of the printed layer comprising a second thickness that is smaller than the first thickness.

The second portion may, at least partly, comprise the longitudinal line and/or the transverse line.

The printing of the printed layer may further comprise increasing the first thickness and/or the second thickness from a toe region to a metatarsal region of the substrate.

The method may further comprise forming at least one recess in the substrate.

The printing of the printed layer may further comprise printing such as to form at least one groove in the printed layer.

The forming of the recess in the substrate and/or the groove in the printed layer may comprise forming the recess and/or the groove with a depth of at least 0.2 mm, preferably at least 0.3 mm. Preferably, the depth is no greater than 2 mm.

The substrate may comprise ethyl vinyl acetate.

The method may further comprise forming a plurality of perforations in the substrate.

A further aspect of the invention concerns a method of producing a shoe comprising an upper and an insole, wherein the method comprises: producing an insole according to an embodiment and inserting an insole into the shoe upper.

SHORT DESCRIPTION OF THE FIGURES

In the following, exemplary embodiments of the invention are described with reference to the figures. The figures show.

DETAILED DESCRIPTION OF PREFERRED EMBODIMENTS

In the following only some possible embodiments of the invention are described in detail. It is to be understood that these exemplary embodiments can be modified in a number of ways and combined with each other whenever compatible and that certain features may be omitted in so far as they appear dispensable.

Figure 1A:
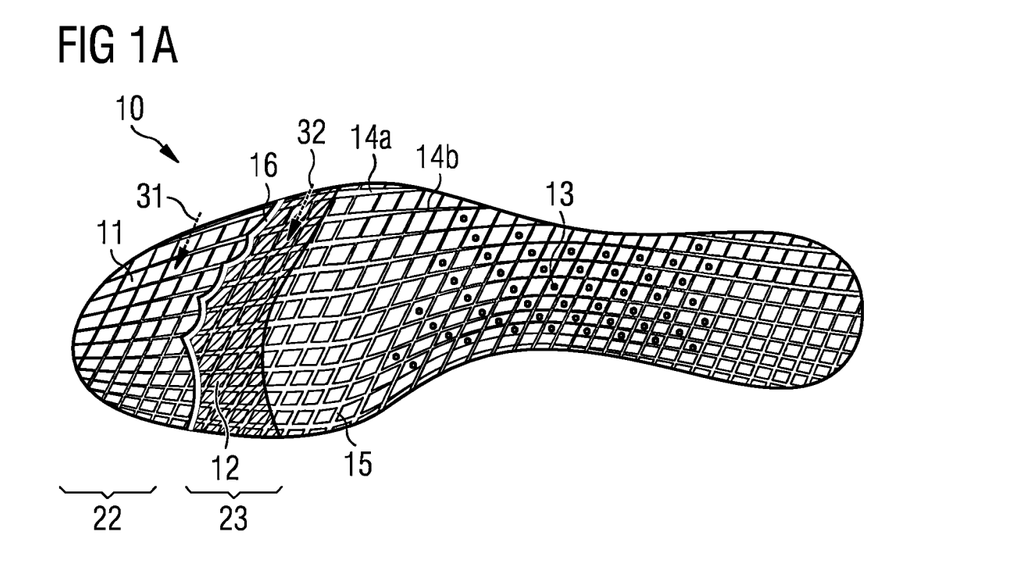
FIGS. 1A-B show an exemplary insole according to an embodiment.

FIG. 1A shows an exemplary insole 10 according to an embodiment. According to this embodiment, an insole 10 comprises a substrate 11 and a printed layer 12, wherein the substrate 11 comprises a first friction coefficient on a reference surface and the printed layer 12 comprises a second friction coefficient on the reference surface, which is higher than the first friction coefficient. The side of the insole 10 shown in FIG. 1A is a foot contacting side of the insole 10.

In this example, reference surface is a clean and flat surface consisting of low-density polyethylene and the static friction coefficient is measured according to ASTM Standard D 1894-01. However, other reference surfaces such as thermoplastic polyurethane and measurement standards such as ISO 15113 version valid on 1 Jan. 2019 may be used. It is only important that the relative size of the friction coefficients of the substrate 11 and the printed layer 12 can be determined.

The insole 10 may also be referred to as a sock liner, shoe liner, footbed etc. The exemplary insole 10 is removable.

The exemplary insole 10 according to this embodiment offers a larger amount of friction in the region to which the printed layer 12 is applied than in regions where the printed layer 12 is not applied.

In this embodiment, the printed layer 12 is applied at least to a metatarsal region 23 of the substrate 11. The printed layer 12 comprises a rubber ink and is screen-printed onto the substrate 11.

The printed layer 12 comprises an indentation 16 on a surface of the printed layer 12 that at least partially surrounds at least one toe. In this embodiment, the printed layer 12 comprises five indentations 16 on the surface of the printed layer 12, wherein each indentation 16 at least partially surrounds a toe.

Figure 2A:
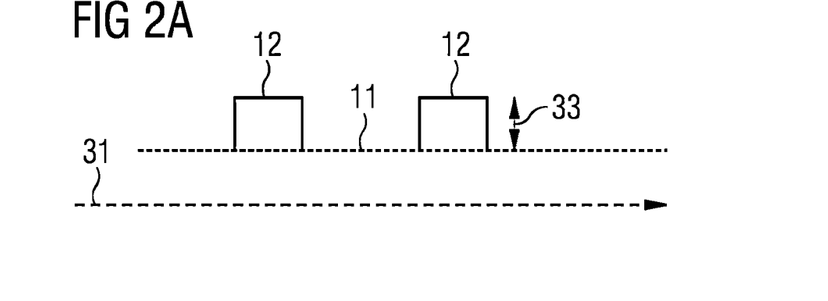
FIGS. 2A-C shows a cross-sectional cuts through the exemplary insole of FIG. 1 according to an embodiment.
Figure 2B:
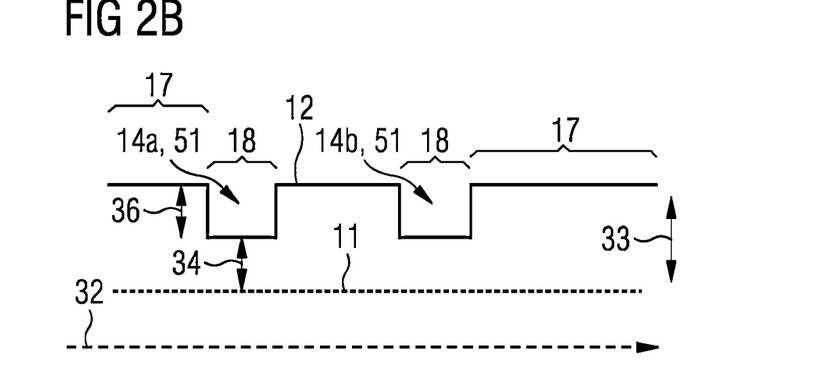

The printed layer 12 comprises a plurality of substantially longitudinal lines, two of which are indicated by reference signs 14 a and 14 b, and a plurality of substantially transverse lines 15, cross-sectional cuts through the longitudinal lines 14 a, 14 b are shown in FIGS. 2A and 2B. Thus, in an area of the insole 10 on the foot contacting side the substrate 11 is exposed between portions of the printed layer 12.

The substrate 11 comprises ethyl vinyl acetate (EVA). EVA provides preferred cushioning properties and is easy to manufacture.

The substrate 11 further comprises a plurality of perforations 13 to improve the breathability of the insole 10 and additionally to control the bending stiffness of the insole 10. In this embodiment, perforations 13 are located in a midfoot region in order to decrease the bending stiffness of the insole 10 in the midfoot region.

The location of the metatarsal 23 and the toe regions 22 is also shown.

Figure 1B:
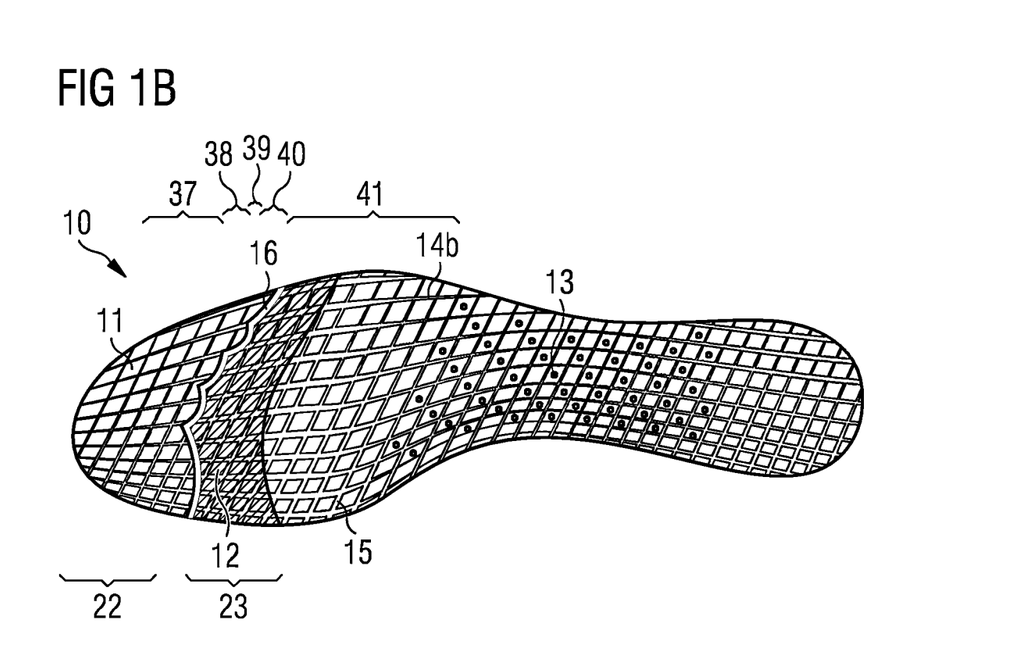
Figure 2C:
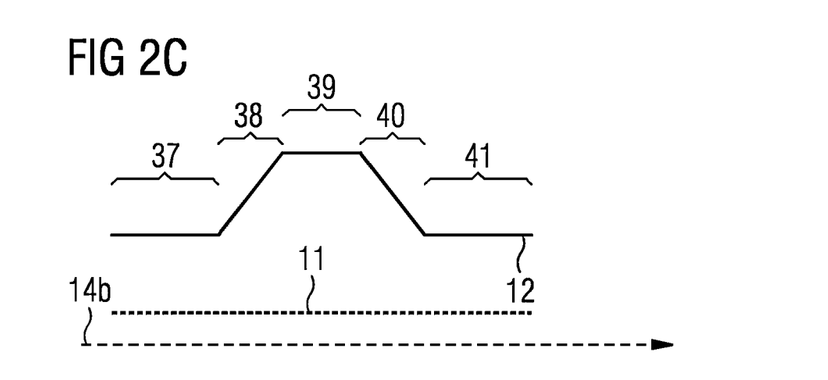

FIG. 1B shows the same as FIG. 1A except that the locations of the various constant thickness portions and gradient raised portions referred to in FIG. 2C are shown.

FIGS. 2A-C show cross-sectional cuts through the exemplary insole 10 of FIG. 1 according to an embodiment. FIG. 2A shows a cross-sectional cut through line 31. FIG. 2B shows a cross-sectional cut through line 32. FIG. 2C shows a cross-sectional cut along exemplary longitudinal line 14b. FIGS. 2A-C are not to scale.

Along cut line 31, the printed layer 12 comprises a thickness of about 0.5 mm.

Along cut line 32, the printed layer 12 comprises a first portion 17 comprising a first thickness 33 of about 1.2 mm. The printed layer 12 further comprises a second portion 18 comprising a second thickness 34 of about 0.5 mm. Therefore, the second portion 18 partly comprises the longitudinal lines 14 a and 14 b and represents a groove with respect to the first portion 17. In other words, the longitudinal lines 14 a, 14 b comprise the second thickness 34. The depth 36 of the groove 51 formed is therefore 0.7 mm. Thus, in an area of the insole 10 on the foot contacting side the printed layer 12 comprises grooves.

As shown in FIG. 2C, the thickness of the printed layer 12 may vary gradually in one or more gradient raised portions. FIG. 2C shows a cut along the longitudinal line 14b with the location of the various gradient raised portions indicated in FIG. 1B. In a first constant thickness portion 37, the printed layer comprises a constant thickness of 0.5 mm. In a subsequent first gradient raised portion 38 the thickness of the printed layer increases gradually from 0.5 mm to 1.2 mm. A subsequent second constant thickness portion 39 comprises a constant thickness of 1.2 mm. Thus, an edge is formed in the second constant thickness portion 39 around indentations 16. The edge does not comprise any grooves in this example. In a subsequent second gradient raised portion 40, the thickness of the printed layer decreases to 0.5 mm. The thickness of the printed layer is constant in a subsequent third constant thickness portion 41.

In other embodiments, the substrate 11 may further comprise at least one recess.

Figure 3:
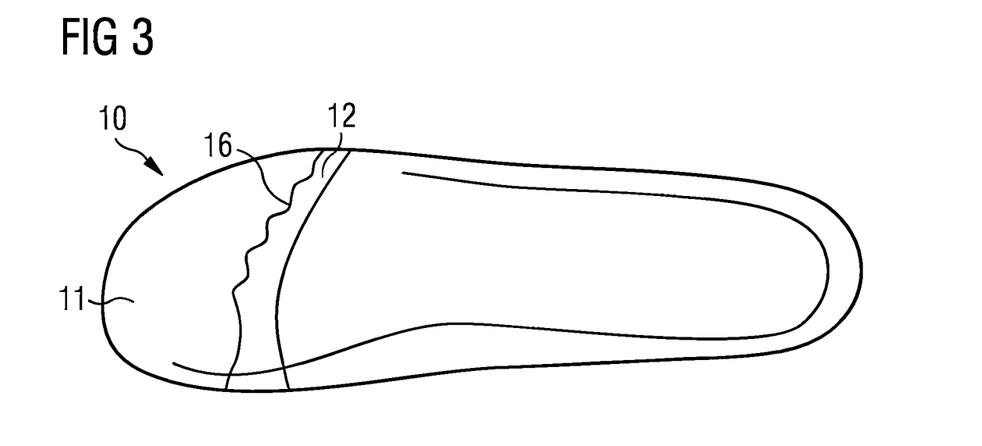
FIG. 3 shows another exemplary insole according to an embodiment.

FIG. 3 shows another exemplary insole 10 according to an embodiment. According to this embodiment, an insole 10 comprises a substrate 11 and a printed layer 12, wherein the substrate 11 comprises a first friction coefficient on a reference surface and the printed layer 12 comprises a second friction coefficient on the reference surface, which is higher than the first friction coefficient. In this embodiment, the printed layer 12 does not comprise any longitudinal or transverse lines. The printed layer 12 comprises an indentation 16 on a surface of the printed layer 12 that at least partially surrounds at least one toe. In this embodiment, the printed layer 12 comprises five indentations 16 on the surface of the printed layer 12, wherein each indentation 16 at least partially surrounds a toe.

Figure 4:
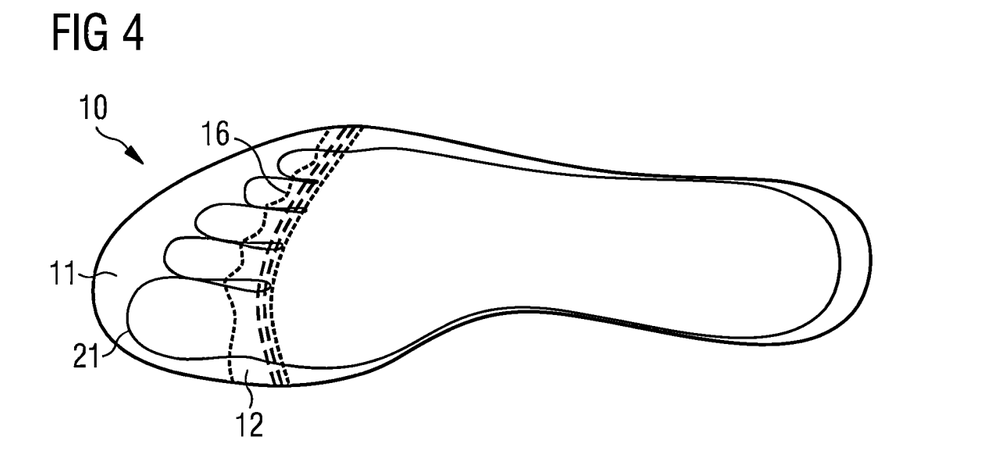
FIG. 4 shows an exemplary insole according to the embodiment of FIG. 3 and an outline of a wearer's foot.

FIG. 4 shows the exemplary insole 10 according to the embodiment of FIG. 3 and an outline 21 of a wearer's foot. As can be seen, the indentation 16 in the printed layer 12 closely match the toes of the wearer's foot. Thus, a good level of support of the toes during a clenching motion may be achieved.

Figure 5:
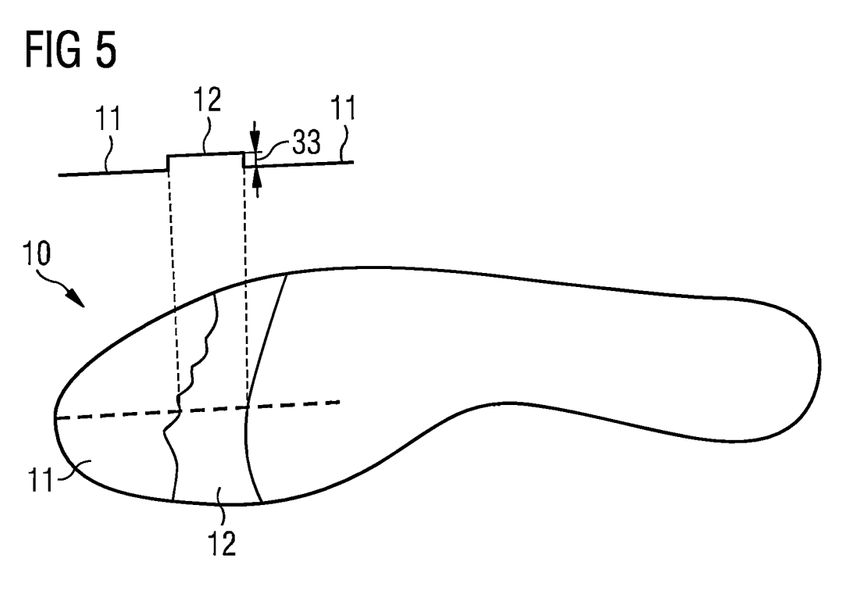
FIG. 5 shows an exemplary insole according to the embodiment of FIG. 3 and a cross-sectional cut through said exemplary insole according to an embodiment.

FIG. 5 shows a cross-sectional cut through the exemplary insole 10 of FIG. 3 according to an embodiment. In this embodiment, the printed layer 12 does not comprise any longitudinal or transverse lines but instead comprises only a single layer of a uniform first thickness 33.

Figure 6:
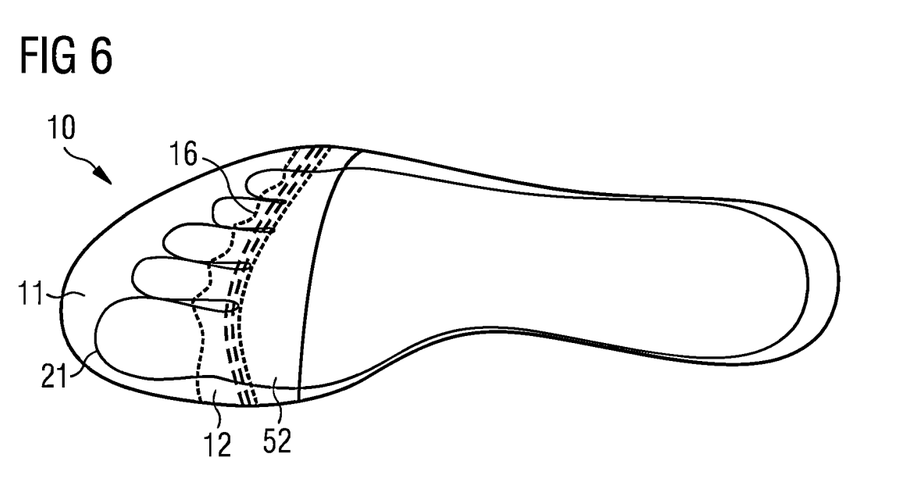
FIG. 6 shows another exemplary insole according to an embodiment.

FIG. 6 shows another exemplary insole 10 according to an embodiment. The exemplary insole 10 is essentially identical to the exemplary insole 10 shown in FIG. 4. However, in this example, the substrate 11 comprises a recess 52 arranged adjacent to the printed layer 12, wherein the recess comprises a depth of about 0.5 mm.

Some embodiments described herein relate to an insole comprising a substrate and a printed layer, wherein the substrate comprises a first friction coefficient on a reference surface and the printed layer comprises a second friction coefficient on the reference surface, which may be higher than the first friction coefficient.

In any of the various embodiments described herein, the printed layer comprises five indentations on the surface of the printed layer, wherein each indentation at least partially surrounds a toe.

In any of the various embodiments described herein, the first and second friction coefficient may be a static friction coefficient.

In any of the various embodiments described herein, the printed layer further comprises a second portion comprising a second thickness that may be smaller than the first thickness.

In any of the various embodiments described herein, a shoe comprises the insole.

Some embodiments described herein relate to a method of producing an insole comprising providing a substrate, wherein the substrate comprises a first friction coefficient on a reference surface; and printing a printed layer, wherein the printed layer comprises a second friction coefficient on the reference surface, which may be higher than the first friction coefficient.

In any of the various embodiments described herein, the printed layer comprises a rubber and/or a polyurethane.

In any of the various embodiments described herein, printing the printed layer comprises forming an indentation on a surface of the printed layer that at least partially surrounds at least one toe.

In any of the various embodiments described herein, printing the printed layer comprises forming five indentations on the surface of the printed layer, wherein each indentation at least partially surrounds a toe.

In any of the various embodiments described herein, the first and second friction coefficient may be a static friction coefficient.

In any of the various embodiments described herein, printing the printed layer further comprises printing a second portion of the printed layer comprising a second thickness that may be smaller than the first thickness.

In any of the various embodiments described herein, the second portion comprises, at least partly, the longitudinal line and/or the transverse line.

In any of the various embodiments described herein, printing the printed layer further comprises increasing the first thickness and/or the second thickness from a toe region to a metatarsal region of the substrate.

In any of the various embodiments described herein, forming the recess and/or the groove comprises forming the recess and/or the groove with a depth of at least 0.2 mm.

In any of the various embodiments described herein, the substrate comprises ethyl vinyl acetate.

Any of the various embodiments described herein, further comprising forming a plurality of perforations in the substrate.

In any of the various embodiments described herein, a method of producing a shoe comprises an upper and the insole, wherein the method comprises producing the insole and inserting the insole into the shoe upper.

REFERENCE SIGNS

10: insole
11: substrate
12: printed layer
13: perforation
14: longitudinal line
15: transverse line
16: indentation
17: first portion
18: second portion
21: outline of wearer's foot
22: toe region
23: metatarsal region
31: first cross-sectional direction
32: second cross-sectional direction
33: first thickness
34: second thickness
35: third thickness
36: depth
37: first constant thickness portion
38: first gradient raised portion
39: second constant thickness portion
40: second gradient raised portion
41: third constant thickness portion
51: groove
52: recess

The invention claimed is:

1. An insole, comprising:
a foot-contacting side;
a substrate; and a printed layer applied to the substrate on the foot-contacting side of the insole, wherein the insole on the foot contacting side comprises a first area and a second area, wherein in the first area the printed layer comprises grooves, and in the second area the substrate is exposed between portions of the printed layer, wherein the printed layer comprises an edge at a boundary between the first area and the second area, and the edge includes an indentation configured to at least partially surround at least one toe, wherein the substrate comprises a first friction coefficient on a reference surface, and wherein the printed layer comprises a second friction coefficient on the reference surface, which is higher than the first friction coefficient.

2. The insole according to claim 1, wherein the printed layer is applied at least to a metatarsal region of the substrate.

3. The insole according to claim 1, wherein the printed layer comprises a rubber or a polyurethane.

4. The insole according to claim 1, wherein the printed layer comprises at least one substantially longitudinal line or at least one substantially transverse line.

5. The insole according to claim 1, wherein the printed layer comprises a first portion comprising a first thickness of at least 0.2 mm, and wherein the printed layer further comprises a second portion comprising a second thickness that is smaller than the first thickness.

6. The insole according to claim 5, wherein the second portion comprises, at least partly, a longitudinal line or a transverse line.

7. The insole according to claim 6, wherein the first thickness or the second thickness increases from a toe region to a metatarsal region of the substrate.

8. The insole according to claim 1, wherein the printed layer is printed such as to form at least one groove in the printed layer.

9. The insole according to claim 1, wherein each of the grooves comprises a depth of at least 0.2 mm.

10. The insole according to claim 1, wherein the substrate comprises ethyl vinyl acetate.

11. The insole according to claim 1, wherein the substrate further comprises a plurality of perforations.

12. The insole according to claim 1, wherein the insole is insertable into a shoe upper.

13. A method of producing the insole according to claim 1, the method comprising:

providing the substrate; and printing the printed layer on the substrate.

14. The method according to claim 13, wherein printing the printed layer comprises printing the printed layer at least onto a metatarsal region of the substrate.

15. The method according to claim 13, wherein printing the printed layer further comprises printing at least one substantially longitudinal line or one substantially transverse line.

16. The method according to claim 13, wherein printing the printed layer further comprises printing a first portion of the printed layer comprising a first thickness of at least 0.2 mm, and wherein printing the printed layer further comprises printing a second portion of the printed layer comprising a second thickness that is smaller than the first thickness.

17. The method according to claim 15, wherein printing the printed layer further comprises printing such as to form at least one groove in the printed layer.

* * * * *

UNITED STATES PATENT AND TRADEMARK OFFICE
CERTIFICATE OF CORRECTION

PATENT NO. : 12,150,519 B2
APPLICATION NO. : 16/945374
DATED : November 26, 2024
INVENTOR(S) : Schuster It is certified that error appears in the above-identified patent and that said Letters Patent is hereby corrected as shown below:

In the Claims

In Column 10, Claim 17, Line 31, delete "15," and replace with --13,--.

Signed and Sealed this
Eleventh Day of February, 2025

Coke Morgan Stewart
*Acting Director of the United States Patent and Trademark Office*